May 25, 1965  J. T. HOOK  3,185,526
SEAT BRACE
Filed April 10, 1963
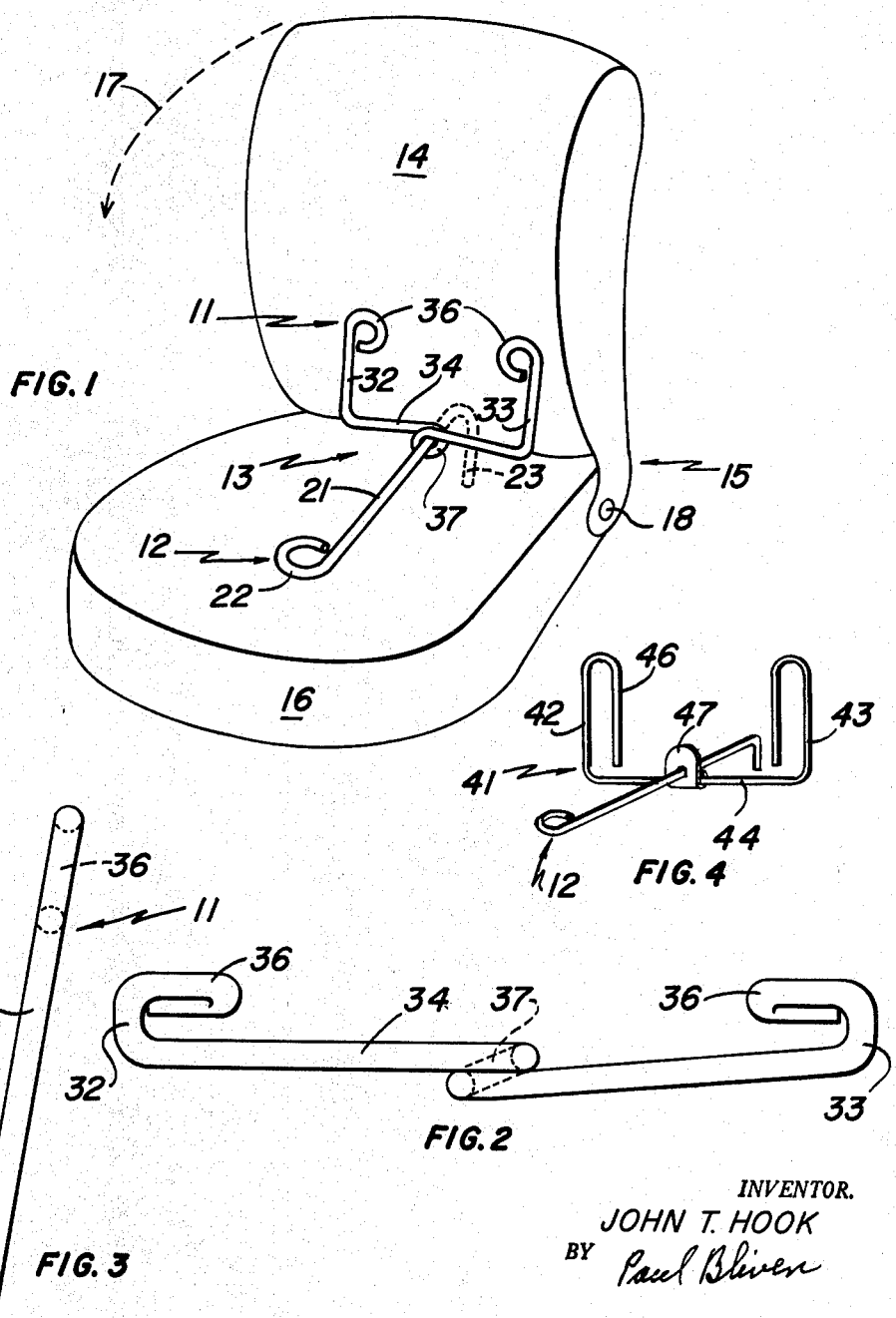
INVENTOR.
JOHN T. HOOK
BY Paul Bliven
ATTORNEY

United States Patent Office 3,185,526
Patented May 25, 1965

3,185,526
SEAT BRACE
John T. Hook, Carmel Valley, Calif.
(10780 Barnett Valley Road, Sebastopol, Calif.)
Filed Apr. 10, 1963, Ser. No. 271,925
5 Claims. (Cl. 297—379)

The present invention relates to a seat brace for preventing the hinged back of an automobile seat from swinging, or folding, forward as it tends to or does when the automobile, to which the seat thereof is attached, stops suddenly. This folding of the seat back is a serious matter when a child is sitting on the seat or is supported on the seat back in a child's seat hung on such seat back. Many children have been injured by the forward movement of the folding seat backs found in many automobiles. This seat back movement aids in throwing the child forward against the automobile floor or instrument panel. The damage to a child may be particularly severe if the child is sitting in a child's seat hung on the automobile seat back above the seat's lower part, or platform.

Most automobiles do not have means provided for locking the back so that it cannot move with respect to the seat's platform. Thus there is need for a simple and inexpensive means for bracing the back of a seat so that it cannot move with respect to the seat platform.

Thus, having in mind the above situation, it is an object of the present invention to provide a brace for a foldable seat back which will hold the seat back in fixed unfolded, upright, position.

A further object of the invention is to provide a seat back brace which is easy to install and to remove from its installed position.

A further object of the invention is the construction of a seat brace that may be used for bracing the backs of various styles and shapes of seats, and which brace is easily adjustable to each and all of such seats.

Another object is that of providing a seat back brace that is simple in construction and low in cost.

Having in mind the above problems and objects, applicant has devised for a folding seat back, a brace constituted of a platform part, so called because it lies on the seat platform and hooks against the back edge of the platform, and, coacting with the platform part, a back piece in contact with the front face of the seat back. The seat back is prevented from folding by an adjustable engagement between the two pieces and by the platform piece being hooked to the back of the platform.

The device briefly described above is hereinafter described in detail and illustrated in the accompanying drawings, in which:

FIGURE 1 is a perspective view of a seat with a hinged back and the present device applied thereto.

FIGURE 2 is a plan view of the back piece seen in FIGURE 1.

FIGURE 3 is a side view of the back piece.

FIGURE 4 is a perspective view of a portion of a modification of the device shown in the other figures of the drawing.

FIGURE 1 is a perspective illustration of the seat brace of the present invention applied to an automobile seat. Such details of construction as may not be clearly depicted in FIGURE 1 are shown by the plan and end views of FIGURES 2 and 3, respectively, of the back piece 11 removed from the platform piece 12, the two pieces comprising a seat brace 13. Each of the pieces 11, 12 is shown as formed from a round rod, and both of the pieces are shown as made from the same diameter rod, about three eighths inch cold rolled steel for the present purpose of bracing the back 14 of an automobile seat 15 from pivotal movement with respect to its platform 16. The back and the platform are secured together for relative pivotal movement with respect to each other, as indicated by the broken line 17, about an axis adjacent and parallel to the rear edge of the seat platform as indicated by a hinge pin 18. Such seats are found in many automobiles, and while such seats may differ from that shown and there are various types in use, they all have the characteristic of the seat back being capable of forward pivotal movement with respect to the seat platform. The present device is intended for use to prevent such pivotal movement of seat backs with respect to their platforms.

The present device consists of the aforementioned back piece 11 and platform piece 12 which act together to form the seat brace 13. The rod of the platform piece 12 is formed with a straight shank 21 having a forward end handle portion 22 formed as a planar loop in the plane of and to one side of the shank, and a rearward end portion 23 in the form of a straight hook substantially normal to the plane of the handle loop 22.

The back piece 11 of the brace 13 may be of the same type steel rod as the platform piece 12. The back piece is U-shaped in its general form with substantially parallel and opposed legs 32, 33 and a bight 34 joining the legs. The upper end of each of the legs is formed with a loop 36 coplanar with the legs. The rod portion forming the bight 34 is bent to form an eye loop 37 below the bight with the axis of the eye's opening inclined rather than normal to the plane of the legs but in a plane normal thereto. The bight is humped so that the bottom of the eye and the lower ends of the legs are aligned as shown in FIGURE 3. The opening of the eye 37 is of a size so that the eye will closely conform to, yet slide on, the shank 21 of the platform piece 12.

In the modification of FIGURE 4, the U-shaped back piece 41 is formed with legs 42, 43 and a straight bight 44 connecting the lower ends of the legs. In this modification, the upper end of each leg is formed with a loop 46 that turns inward of the U-shape and downward parallel to but spaced from the leg until the end of the rod is adjacent the bight 44. Secured medially and to the front side of the bight is an eye formed by a holed tab 47, or arch. The opening in the arch is big enough and extends above the bight enough so that the shank 21 of the platform piece 12 will pass thru the arch 47 and will contact the top of the arch opening and the top of the bight 44 when the platform piece is horizontal and the back piece is pivoted forward as far as possible. This is the lock position of the brace's pieces.

The operation of both modifications is the same, and may be described by using the modification of FIGURES 1, 2, and 3. The hook 23 of the platform piece 12 is passed thru the opening of the eye 37 of the back piece 11 until the eye slides on the shank 21 of the platform piece and well therealong. The platform piece and the back piece are then placed on the platform 16 of a seat so that the platform piece lies on the platform with the hook to the rear and the back piece 11 extending upward from the platform. The handle 22 is rotated so that the hook 23 lies on the seat platform. The hook is then moved rearwardly of the seat so as to pass below the seat back 14 and to the rear of the seat platform 16. The handle is then rotated to lie on the platform with the hook projecting downward from the shank so that when the platform piece is moved forward the hook will engage the rear edge of the platform and stop such movement. The back piece 11 is then moved along the shank, guided thereon by the eye 37, and against the seat back. The resiliency of the seat back and any forward movement thereof tips the back piece forward until the edges of the opening in the eye 37, or tab 47 acting as catches, engage and lock on the shank 21 of the platform piece 12 in the manner of a pawl and ratchet. In fact, the back piece is forced against the seat back until it locks on the platform piece. This locking action is enhanced by the plane of the eye being tipped forward from the plane of the legs so that the upper ends of the legs engage the seat back before the lower ends. Once the brace is in position as described above, the seat back is prevented from pivoting forward. The brace is easily removed from a seat by forcing backward the upper ends of the legs of the back piece until the eye unlocks from the shank. The eye is then slid forward along the shank so that the parts will not again lock together, the hook is rotated until it will pass forward between platform and seat back so that the brace may be disengaged from the seat.

Having thus described the construction and use of my invention, I claim:

1. A seat brace, comprising: a platform piece and a back piece; the platform piece being in the form of a rod having an elongated shank, a handle portion in the form of a loop at one end thereof coplanar of and to one side of said shank, and a hook portion formed by a bend in said rod adjacent the other end thereof with the hook portion coplanar of said shank and normal to the plane of said handle portion; and said back piece being in the form of a substantially planar U-shaped rod having spaced apart legs joined by a bight, and a catch and guide integral with said back piece medially of the bight thereof; said catch and guide conforming to said shank to guide said back piece along said shank and to prevent movement therealong.

2. The combination of claim 1 in which each leg end is formed as a loop in the plane of the legs.

3. The combination of claim 1 in which said catch and guide is formed by a loop of said U-shaped rod.

4. The combination of claim 1 in which said catch and guide is formed with a short length opening therein which loosely conforms to said shank.

5. The combination of claim 1 in which said catch and guide is formed by a plate secured at an edge portion thereof to said back piece, and said plate formed with an opening therein of a size to conform to said shank.

References Cited by the Examiner
UNITED STATES PATENTS

| | | | |
|---|---|---|---|
| 2,752,988 | 7/56 | Marvin | 297—379 |
| 2,818,274 | 12/57 | Manos | 297—379 |
| 3,028,198 | 4/62 | Murr | 297—379 |

FRANK B. SHERRY, *Primary Examiner.*